US Patent

[19] Sarishvili et al.

[11] 4,265,914
[45] May 5, 1981

[54] CONTINUOUS-FLOW WINE CHAMPAGNIZATION PROCESS

[76] Inventors: Naskid G. Sarishvili, ulitsa Khalturinskaya, 11, kv. 231; Alla E. Oreshkina, Krymsky val, 8, kv. 37; Evgeny N. Storchevoi, Nakhimovsky prospekt, 9, korpus 1, kv. 59, all of Moscow, U.S.S.R.

[21] Appl. No.: 791,167

[22] Filed: Apr. 27, 1977

Related U.S. Application Data

[63] Continuation of Ser. No. 658,097, Feb. 13, 1976, abandoned.

[51] Int. Cl.$^3$ ................................................ C12G 1/06
[52] U.S. Cl. ........................................ 426/13; 426/15; 435/813
[58] Field of Search ............................ 426/11, 13, 15; 195/116; 435/813, 288, 261

[56] References Cited

U.S. PATENT DOCUMENTS

| | | | |
|---|---|---|---|
| 3,062,656 | 11/1962 | Agabalianz et al. | 426/15 |
| 3,545,978 | 12/1970 | Agabaliants et al. | 426/15 X |
| 3,737,323 | 6/1973 | Berdelle-Hilge | 195/116 X |

Primary Examiner—David M. Naff
Attorney, Agent, or Firm—Steinberg & Raskin

[57] ABSTRACT

Wine is champagnized by a continuous-flow process wherein a stream of champagne wine-stock, saccharose and yeast cells is continuously passed for secondary fermentation at a temperature up to 15° C. through a yeast mass accumulated by separation of yeast from the stream. During secondary fermentation the wine is enriched with biologically active substances from autolyzed yeast and is freed of yeast cells while the yeast mass increases in concentration to 5–10 billion cells per ml. Completely champagnized wine stock substantially free of yeast cells is obtained in about 17 days. The process enables intensification of champagnization by 5 to 6 times due to the use of yeast exceeding by 10–15 times the concentrations usually employed. The process can be continued for a time period of 2–3 years without stopping the process to recharge.

1 Claim, No Drawings

CONTINUOUS-FLOW WINE CHAMPAGNIZATION PROCESS

This is a continuation of application Ser. No. 658,097, filed Feb. 13, 1976, now abandoned.

The present invention relates to the production of sparkling wines and, more specifically, to a continuous-flow wine champagnization process.

The present invention can be used in commercial processes associated with utilization of microorganisms such as wine-making, alcohol production, brewery.

Known in the art is a continuous-flow wine champagnization process, wherein the starting fermentation broth consisting of champagne wine-stock, saccharose in an amount of 2–2.2 g/100 ml and yeast cells in an amount of 3–5 mln/ml is subjected to a secondary fermentation at a temperature within the range of 12° to 15° C., followed by enrichment of the resulting champagnized wine with biologically active yeast substances. The process is conducted by passing the starting fermentation broth under the pressure of 0.5 MPa (MegaPascal) through 6–7 series-connected cylindrical hermetized apparatus, wherein said secondary fermentation is carried out. Thereafter, the fermentation broth is passed into a separate apparatus filled with packing on which packing yeast cells are collected. In this apparatus the stage of enrichment of the resulting champagnized wine with biologically active principles of yeast is conducted.

Also known in the art is a continuous-flow wine champagnization process, wherein the starting fermentation broth of a similar composition is subjected to a secondary fermentation in a single-multi-chamber tank, followed by enrichment of the champagnized wine with biologically active principles of yeast in a separate packed apparatus, wherein yeast cells are accumulated on the packing.

Taking into account the fact that enrichment of champagnized wine with biologically active yeast substances in the prior art processes occurs mainly after completion of the secondary fermentation, and the total duration of champagnization process (including secondary fermentation and enrichment) is a constant value equal to 17 days, the enrichment stage duration is $\frac{1}{3}$ of the total process time.

Furthermore, said secondary fermentation is effected at a low concentration of yeast cells entrained with the wine stream while physiological activity of yeast in each successive apparatus or chamber of a tank is gradually decreased due to an increased age thereof. This occurs due to the fact that young yeast of a 3–5 days' culture reach 20–22 days age after having passed successively all the apparatus or chambers. This low concentration of yeast used in the prior processes in conjunction with natural depression of their fermentative function results in retardation of the secondary fermentation by the end of the process and inefficient use of the working space of fermentation tanks. Moreover, the resulting champagnized wine contains 0.5–0.8 mln of yeast cells per one milliliter of wine, whereby bottling thereof without filtration becomes impossible.

It is an object of the present invention to intensify the champagnization process.

It is another object of the present invention to provide a process of wine champagnization which would make it possible to improve the product quality and increase its output from a unit of the production area.

Still another object of the present invention is to simplify the process control and regulation.

These and other objects of the present invention are accomplished by a continuous-flow wine champagnization process comprising a secondary fermentation, at a temperature of up to 15° C., of the starting fermentation broth consisting of champagne wine-stock, saccharose and yeast cells, followed by enrichment of the resulting champagnized wine with biologically active yeast substances, wherein, in accordance with the present invention, the process is performed in a single apparatus with the stages of secondary fermentation and enrichment being combined by way of passing the starting fermentation broth through a yeast mass accumulated by continuously separating the yeast cells from the wine stream.

It is advisable that said accumulation of yeast cells be performed to a concentration thereof within the range of from 5 to 10 billions per one milliliter of wine.

To shorten the start-up period, it is advisable to introduce into the apparatus, during this period, additional amounts of yeast cells ranging from 1 to 4 mln per one milliliter of wine.

To improve the product quality, it is advisable that the secondary fermentation be conducted at a temperature within the range of from 4° to 6° C.

The continuous-flow wine champagnization process according to the present invention is preferably performed in the manner as follows.

Champagne wine-stock with a saccharose content of 2–2.2 g per 100 ml is continuously fed to champagnization simultaneously with yeast inoculation at the rate of 3–5 mln of yeast cells per one ml. The resulting starting fermentation broth is fed into an apparatus provided with packing made, for example, of polyethylene, porcelain, ceramics, wherein the secondary fermentation is effected at a temperature within the range of from 4° to 6° C. along with enrichment of the champagnized wine. Yeast, while being fed into the tank, are practically completely entrapped by the packing, whereby their contact with wine is improved and their concentration in the apparatus is progressively increased. Preferable concentration of yeast ranges from 5 to 10 billions per one milliliter. This concentration is explained by the necessity to provide the conditions, whereupon biochemical processes occurring under classic production of champagne are simulated. With the above-mentioned amount of yeast, their specific concentration in a unit volume of the wine being champagnized corresponds to that of the classic process taking into consideration a shortened period of champagnization reduced from three years to 17 days. Presence, in the apparatus, of said amount of yeast among which there are always physiologically active ones, ensures practically complete fermentation of sugar for 3 to 5 days instead of 17 days as usual. During the remaining time (14 to 12 days) the champagnized wine is enriched with biologically active substances of the autolyzed yeast being present in the packing in an amount exceeding, by 10 to 15 times, usual concentrations thereof. Due to this fact, the product obtained features better qualitative characteristics and is practically free from yeast cells.

The thus-produced champagnized wine contains, as compared to the wine produced by the prior art processes, diacetyl in an amount which is 6 to 8 times less than the prior art and aldehydes in an amount which is 1.5–2.0 times less; at the same time, activity of the enzymes is increased by 2 to 4 times.

During the start-up periods, i.e. first 2–3 months, the wine being champagnized is continuously added directly with additional amounts of yeast ranging from 2 to 4 mln/ml. To this end, the inoculating yeast stream is divided into at least three flows. One flow, i.e. basic one, is fed into the starting fermentation broth at the rate of 3–5 mln/ml prior to the fermentation beginning; the second and third flows are fed directly into the wine being champagnized during the fermentation process. In doing so, the second flow of the inoculating yeast is introduced into that zone of the wine being champagnized, wherein the content of sugar is within the range of from 0.8 to 1.2 g/100 ml while the third flow is introduced into that zone of the wine being champagnized, wherein the content of sugar is 0.4 to 0.6 g/100 ml. Yeast cells are uniformly distributed within the apparatus in the direction from its centre towards the periphery.

On completion of the start-up period and achievement of the yeast cell concentration in the apparatus of the order of 5 billions per one milliliter, the additional supply of yeast is substantially reduced, for example by 2 times and stopped one-two months thereafter.

Continuous accumulation of yeast cells makes it possible, on one hand, to compensate for the decreased fermentative function of yeast due to increased age thereof and, on the other hand, to increase physiological activity of young yeast continuously fed with the wine stream owing to the decomposition products of aged yeast.

The process according to the present invention enables intensification of the champagnization by 5 to 6 times due to the use of yeast in the amount exceeding by 10–15 times the concentrations usually employed in the prior art processes; as well as due to uniform distribution of the yeast over the apparatus packing, compensation of the weakened fermentative function of aged yeast and increased activity of young yeast. Furthermore, the process control and regulation becomes substantially simplified.

As a consequence, there occurs practically complete fermentation of sugar with young physiologically active yeast even during the initial period of the process, followed by enrichment of the wine champagnized in the same apparatus with biologically active substances of autolyzed yeast.

Therefore, the practical implementation of the process according to the present invention makes it possible to obtain, during 2–3 years without re-charging the apparatus, a ready-to-use champagnized wine practically free of yeast cells, whereby the problem of filtration-free bottling of champagne becomes practically solved.

The required productivity of the process is ensured by means of an appropriate increase of the fermentation tank capacity or by selection of a required number of fermentation tanks which are connected in parallel in the common process scheme, whereby the product output from a unit production area is increased by 2–3 times.

In the process according to the present invention separation of yeast cells from the champagnized wine flow can be effected also in a hydrocyclone, electromagnetic or electrostatic field, or in any separating means.

For a better understanding of the present invention some specific examples illustrating the process of wine champagnization are given hereinbelow.

EXAMPLE 1

The starting fermentation broth consisting of champagne wine-stock, saccharose in an amount of 2–2.2 g/100 ml and yeast in an amount of 3–5 mln/ml is continuously fed into an apparatus filled with polyethylene packing which entraps yeast cells. In this apparatus under the pressure of 0.5 MPa and at the temperature of 5° C. there occurs a secondary fermentation, whereupon the sugar content is reduced down to 0.2 g/100 ml. Thereafter, the wine is enriched with biologically active substances of the autolyzed yeast at the temperature of 8° C. Accumulation of yeast cells is effected until the concentration of 7 billions per one milliliter is reached.

The resulting product is characterized by the following physico-chemical properties:
dyacetyl content: none
free aldehydes: 3 mg/l
reducing power: 0 sec
activity—fructofuranosidase: 168 units.

EXAMPLE 2

The starting fermentation broth of a composition similar to that described in the foregoing Example 1 is continuously fed into an apparatus filled with polyethylene packing. During the start-up period the apparatus is continuously fed with two additional streams of yeast at the sugar concentration in the wine being champagnized of 1 g/100 ml and 0.6 g/100 ml respectively.

Total amount of additionally introduced yeast is 3 mln/ml. Accumulation of yeast is conducted until the concentration thereof of 5 billions per one milliliter is reached, whereafter their additional supply is discontinued.

Secondary fermentation and enrichment is effected at the temperature of 15° C.

The thus-prepared product has physico-chemical composition and properties similar to those of Example 1.

What is claimed is:

1. A process for champagnization of wine which comprises continuously passing for secondary fermentation a starting fermentation broth consisting essentially of champagne winestock, saccharose and yeast cells at a temperature of up to 15° C. through a yeast mass located on a separator which retains the yeast cells which are deposited thereon by sedimentation from the wine stream, whereby during the passage through for secondary fermentation the champagnized wine is simultaneously enriched with biologically active substances from the yeast and freed of yeast cells while the yeast mass increases in concentration; and continuing the passing of fermentation broth through said yeast mass until the concentration of yeast cells reaches 5–10 billion per ml of wine, thus continuously completely champagnizing said wine stock in about 17 days to obtain a high output of ready to use champagnized wine substantially free of yeast cells, said process being continued during a time period of 2–3 years without recharging.

* * * * *